March 29, 1949.  T. D. GERBER  2,465,530
HEIGHT GAUGE
Filed Nov. 27, 1945
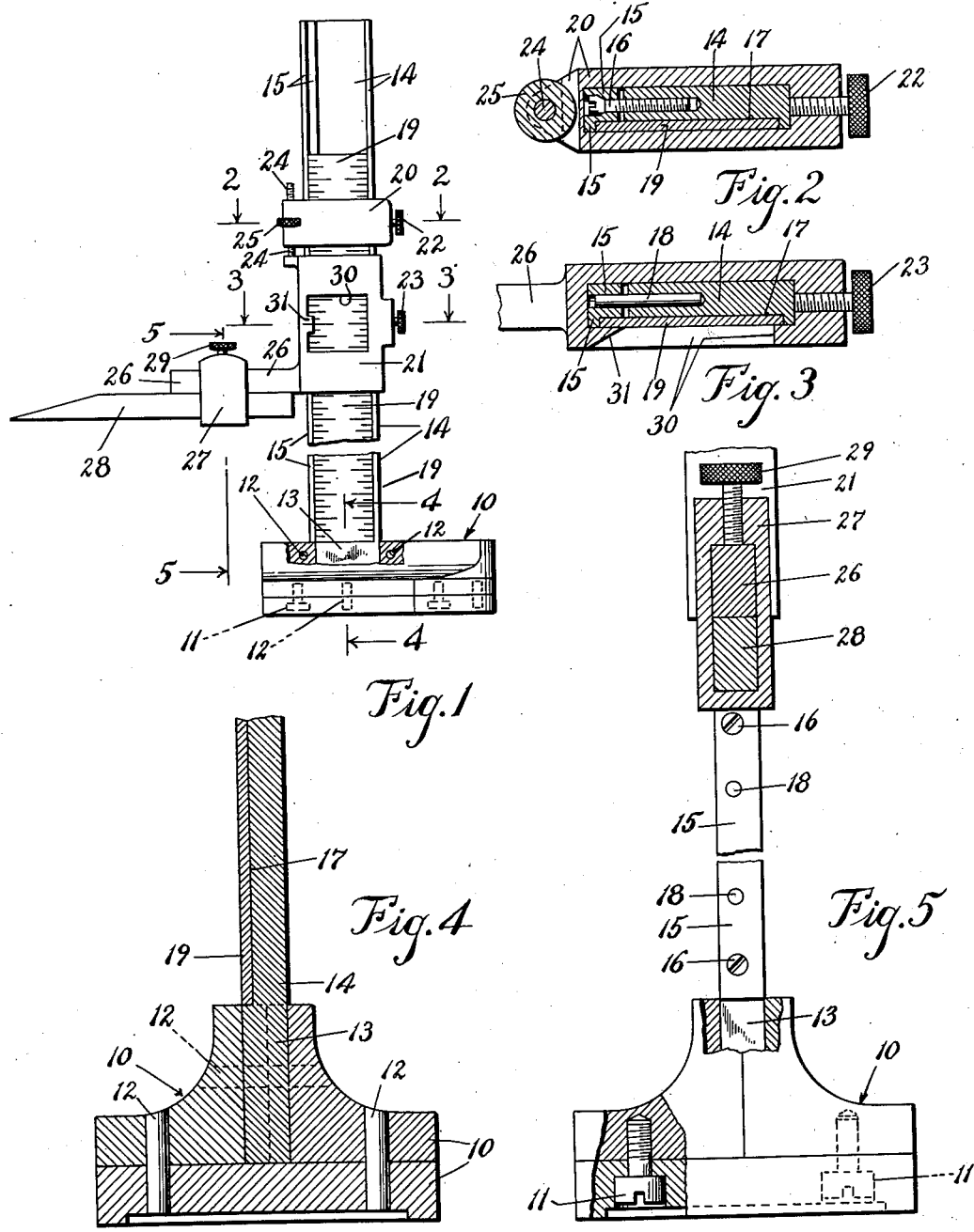
INVENTOR,
Theodore D. Gerber
By Henry Molz
ATTORNEY.

Patented Mar. 29, 1949

2,465,530

UNITED STATES PATENT OFFICE 2,465,530

HEIGHT GAUGE

Theodore D. Gerber, Glendale, Calif.

Application November 27, 1945, Serial No. 631,068

3 Claims. (Cl. 33—169)

The principal object of my invention is the production of a height gauge arranged for interchangeably affixing thereto rulers of varying graduation and calibration, the common graduated or calibrated rule, shrink scale rule, English measure rule, metric scale measure rule, or a combination thereof, for example, as best meets the requirements of the job in hand, the obtaining of the height of projections from a plane surface or the location of bushings in jigs, etc., for example.

A further object of my invention is the production of a height gauge, which, with the use of a vernier and suitable rule thereon disposed, is readable to thousandths of an inch.

A further object of my invention is the production of a height gauge which may readily be used for measuring patters, castings and machine parts in the routine process of measuring the same.

And a still further and highly advantageous object of my invention is in the production of a gauge of said characteristics adapted for use in the place and stead of shrink conversion tables as commonly employed in connection with the use of the standard height gauge, in the construction or checking of patterns and castings, the invention in said regard providing an ideal means for the attachment of a suitable shrink scale rule in keeping with the kind of metal used in the production of the pattern or casting upon which the gauge is to be employed.

I attain these objects with the height gauge illustrated in the accompanying drawings, in which:

Figure 1 is an elevation of the invention with parts broken away to aid in its illustration;

Figure 2 is a section taken on line 2—2 of Figure 1;

Figure 3 is a section taken on line 3—3 of Figure 1;

Figure 4 is a section taken on line 4—4 of Figure 1, and

Figure 5 is a section taken on line 5—5 of Figure 1.

Similar numerals indicate like parts throughout the several views.

The gauge is shown as embodying the usual base 10 which for purposes of construction is assembled from three parts fastened together by means of screws 11, and dowels 12 clasp the lower end 13 of a vertically disposed bar or standard 14.

The end 13 of the bar 14 is rectangular in cross section, but that part of the bar 14 above the base 10 is reduced in width and tooled out so as to be L-shaped in cross section.

A clamping bar 15, also L-shaped in cross section but narrower than the bar 14 is adjustably attached by screws 16 to the bar 14, and both L-shaped bars are positioned together to form a channel 17.

Dowels 18 assist the screws 16 in supporting the bar 15.

The channel 17 forms a housing or retaining support for embracing a graduated or calibrated scale 19 of any desired graduations or calibrations.

The bar 15 is adjustably movable toward the bar 14 in order to reduce the width of the channel 17, thereby clamping the scale 19 between said bars.

A pair of rectangular bands 20 and 21 are slidably mounted about the combined bars 14 and 15, and are provided respectively with screws 22 and 23 for locking said bands 20 and 21 to the bar 14 at any desired height.

One end of a screw 24 is fixed in the band 21 and extends through one end of the band 20 and a knurled nut 25 whereby the bands 20 and 21 may be moved towards or from each other.

An arm 26 extends horizontally from one side of the band 21 to suspend a slidable band 27 supporting a horizontal pointer bar 28.

The band 21 is provided with a window-like hole 30 in one of its sides (the face side), with a short tongue 31 extending into the hole 30. The tongue 31 has a scored line thereon whereby the height of the pointer 28 above the bottom of the base 10 may be ascertained by looking through the hole 30 and comparing the aforementioned scored line with the calibrations on the scale 19.

A finer reading can be obtained by locking the band 20 by means of the screw 22 and then adjusting the band 21 upwardly or downwardly by means of the nut 25. The band 21 can then be locked to the obtained position by means of the screw 23.

In connection with the use of the standard height gauge, experience has amply proven that in operations commonly employing a shrink conversion table, that in many instances use of an improper table for the work in hand results in incorrect measurements, vexation, undue delay and increased costs. My invention is designed to eliminate each of said objectionable features.

The invention may be made in any desired height, and will function with the correctly graduated or calibrated scale rule attached in the identical manner common to the standard height gauge the market affords. Moreover, it may readily be produced from materials the market affords and at no great cost.

As a change in structure may from time to time suggest itself without departing, however, from the scope and practicability thereof as herein disclosed and described in the claims, it is intended that the description and drawing shall be interpreted as illustrative and not in a limiting sense.

What I do claim, however, and desire to secure by Letters Patent, is:

1. In a height gauge, a base, a standard thereon, a clamping bar extending alongside and opposite a side edge of said standard, a gauge unit slidably embracing said standard and clamping bar and removable endwise therefrom, a scale member lying against a face of said standard, cooperating longitudinal flanges on said clamping bar and standard for clamping against opposite edges of said scale member to hold said scale member in place and means for moving said clamping bar into and out of position for releasably clamping the flange thereon against said scale member, said gauge unit having portions which slidably contact the outer face of said scale member to assist in holding the scale member in place, said standard bar and gauge unit being constructed and arranged so that upon removal of said gauge unit said clamping bar may be loosened to release said scale member whereby a differently calibrated scale member may be inserted and clamped in place and then the gauge member slidably positioned over the standard and clamping bar.

2. In a height gauge, a base, a standard thereon, a clamping bar opposed to a side edge of said standard and extending from said base to the top of said standard, guide pins on said standard supporting said clamping bar for movement towards and away from said standard, a scale member removably positioned against said standard, cooperating flanges on said clamping bar and standard arranged to contact opposite edges of said scale member to hold it on the standard, screw means for moving said clamping bar to clamp said scale member between said cooperating flanges and operative to release said scale member whereby a differently graduated scale may be substituted, a gauge unit slidable on and embracing said bar and said standard, and portions on said slidable gauge unit overlying said scale member.

3. In a height gauge, a base, a standard thereon having a rectangular cross section, a clamping bar extending opposite a side edge of said standard, guide pins on said standard supporting said clamping bar for movement towards and away from said standard, a scale member removably positioned against said standard, cooperating flanges on said clamping bar and standard arranged to contact opposite edges of said scale member to hold it on the standard, screw means for moving said clamping bar to clamp said scale member between said cooperating flanges and operative to release said scale member whereby a differently graduated scale may be substituted, a gauge unit slidable on and embracing said bar and said standard, a set screw for holding said gauge unit in adjusted position on said standard, said gauge unit being removable endwise from said standard and bar, said scale member having its outer face flush with the outer edges of said cooperating flanges between which it is clamped.

THEODORE D. GERBER.

REFERENCES CITED

The following references are of record in the file of this patent:

UNITED STATES PATENTS

| Number | Name | Date |
| --- | --- | --- |
| 1,272,997 | Powell | July 16, 1918 |
| 1,404,425 | Bartholdy | Jan. 22, 1922 |
| 2,412,870 | Champlin | Dec. 17, 1946 |

OTHER REFERENCES

Publ.: K & E Catalogue (general), 1927, p. 298.

Certificate of Correction

Patent No. 2,465,530. March 29, 1949.

THEODORE D. GERBER

It is hereby certified that error appears in the printed specification of the above numbered patent requiring correction as follows:

Column 1, line 18, for "patters" read *patterns*;

and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*